G. J. VON HAGEL.
OILING DEVICE.
APPLICATION FILED MAY 23, 1913.
1,086,293.
Patented Feb. 3, 1914.
2 SHEETS—SHEET 1.
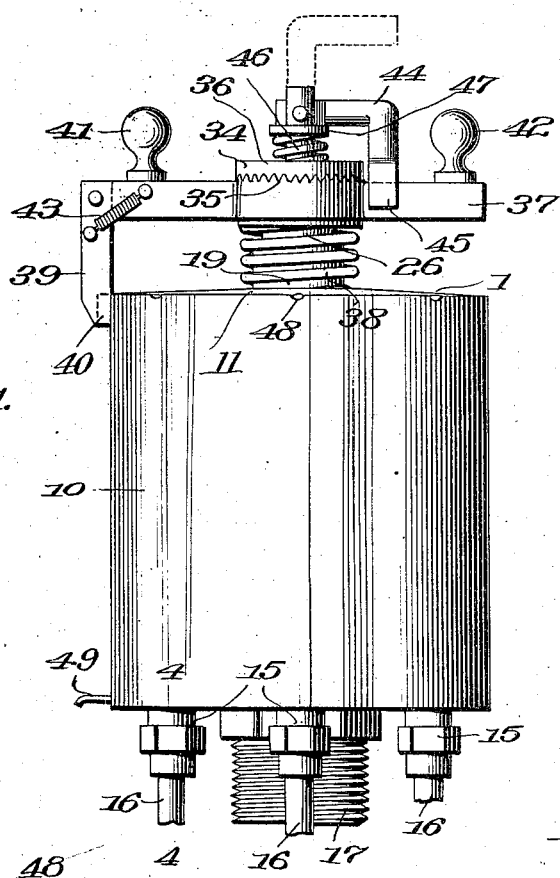
Fig.1.
Fig.2.
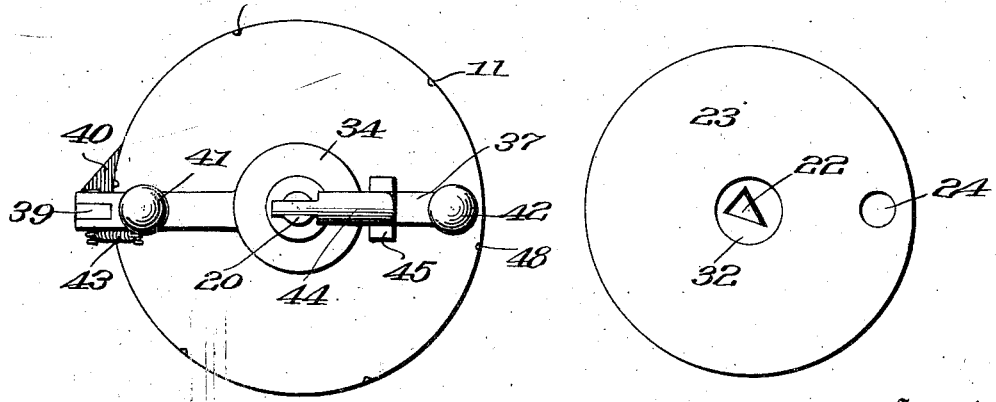
Fig.7.
Witnesses
Inventor
G. J. Von Hagel,
By Victor J. Evans
Attorney

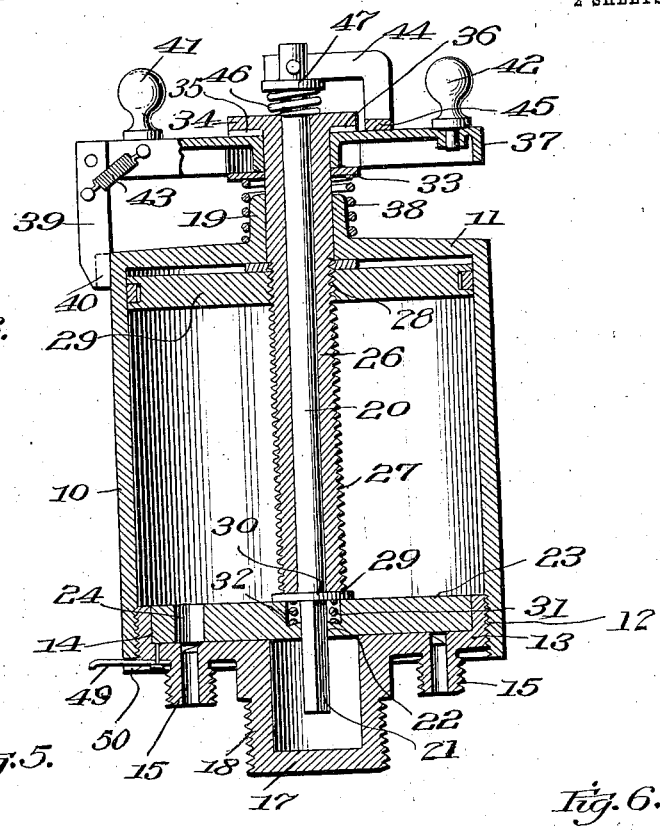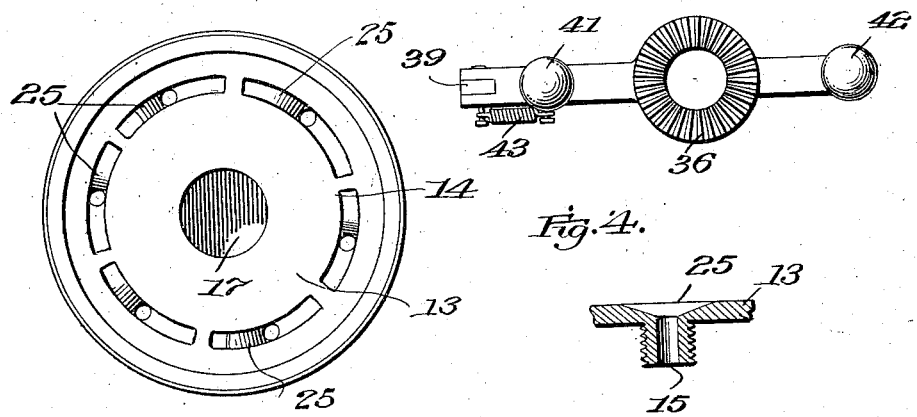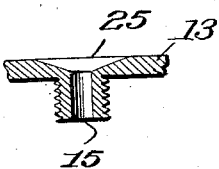

UNITED STATES PATENT OFFICE.

GERT J. VON HAGEL, OF AKRON, IOWA.

OILING DEVICE.

1,086,293. Specification of Letters Patent. Patented Feb. 3, 1914.

Application filed May 23, 1913. Serial No. 769,470.

*To all whom it may concern:*

Be it known that I, GERT J. VON HAGEL, a citizen of the United States, residing at Akron, in the county of Plymouth and State of Iowa, have invented new and useful Improvements in Oiling Devices, of which the following is a specification.

The invention relates to oiling devices, and more particularly to the class of multiple hard oil lubricating devices.

The primary object of the invention is the provision of a device of this character wherein one or more bearings can be oiled with a uniform or predetermined quantity of hard oil without requiring an attendant subjecting himself to danger by contact with the parts of the machinery to be oiled.

Another object of the invention is the provision of a lubricating device which can be placed at any point about a machine and operated successfully and accurately, thus making it unnecessary to subject a person to the parts of the machinery.

A further object of the invention is the provision of a lubricating device wherein one or all bearings of machinery may be oiled at one time in a quick and convenient manner.

A still further object of the invention is the provision of a lubricating device wherein any number of bearings may be oiled with hard oil without necessitating filling more than one oil cup.

A still further object of the invention is the provision of a lubricating device which is simple in construction, thoroughly reliable and efficient in its purpose, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawings—Figure 1 is a side elevation of a lubricating device constructed in accordance with the invention and showing a series of oil feed pipes connected therewith. Fig. 2 is a top plan view. Fig. 3 is a vertical longitudinal sectional view through the lubricating device. Fig. 4 is a fragmentary vertical sectional view through the bottom of the oiler, showing in detail one of the channels and the communicating outlet nipple. Fig. 5 is a plan view of the inner side of the bottom of the body of the oiler. Fig. 6 is a plan view of the operating arm detached. Fig. 7 is a plan view of the oil distributing disk.

Similar reference characters indicate corresponding parts throughout the several views in the drawings.

Referring to the drawings by numerals, the lubricating device comprises a cylindrical body 10 preferably made from metal and forms an oil cup having an integral top 11, while the lower end of the said body is formed with internal screw threads 12 for the detachable engagement therewith of the externally threaded bottom 13 which is formed with a seat 14, the bottom 13 being provided with any number of depending externally threaded discharge nipples 15 to which are connected lead pipes 16 which extend to and communicate with respective bearings of machinery so that the oil contained within the body 10 will be delivered therefrom to said bearings on operating the lubricating device in a manner hereinafter fully described.

The nipples 15 are arranged concentrically with respect to a central hollow boss 17 closed at its outer free end and which is externally threaded at 18 for the fastening thereof in the body or at any point on the machinery to be lubricated.

Integrally formed centrally with the top 11 and rising therefrom is a collar 19 through which is passed a turning shank or stem 20, the lower end portion 21 of which is of triangular shape in cross section, while its major portion is of circular formation, the said lower portion 21 being slidably engaged in a correspondingly shaped central opening 22 formed in an oil distributing or valve disk 23 which is held within the seat 14 and is superimposed upon the bottom 13 interiorly of the body 10, the said disk being provided near its outer periphery with a discharge port 24 which is adapted to register with varying sized channels 25 formed in the bottom 13 of the body and communicate with the nipples 15 so that oil contained in the said body 10 will be delivered through the port 24 into the channels 25, thence through the nipples 15 to the pipe 16 for the feeding of the oil to the respective bearings of the machinery, the oil in the body 10 being compressed in a manner presently described, and these channels 25 are arranged an equal distance from each other, as shown.

Surrounding the stem or shank 20 throughout the round portion thereof is a feed sleeve 26 provided with external screw threads 27 engaging a correspondingly threaded central aperture 28 formed in a compression or follower disk 29 which is arranged in the body for movement throughout a greater portion of the length thereof and is adapted to act upon a body of oil therein for compressing the same when the sleeve 26 is rotated so that the oil will be delivered to the pipe 16 to be conveyed to the bearings of the machinery. The inner end of the sleeve 26 rests against the washer 29, which works against a shoulder 30 formed by the triangular shaped end 21 of the shank or stem 20, and against this washer 29 bears one end of a coiled expansion spring 31 which surrounds the triangular-shaped end of the shank or stem 30 while its opposite end rests against a beveled counter seat 32 formed centrally in the disk 23, the spring being designed to hold down the disk 23 and is fastened in any suitable manner to the under face of the said washer 29. The sleeve 26 at its upper end portion is non-threaded and is adapted for sliding movement in the collar 19 and is formed with an out-turned annular head 34 provided with a clutch face 35 for engagement with a similar clutch face 36 formed on an operating arm 37, the latter being held in position whereby the clutch face 36 thereof will normally engage the clutch face 35 on the sleeve by means of a coiled expansion spring 38 surrounding the collar 19 and working against the top 11 of the body and an interposed washer 33 between the spring and the arm so that when the arm is turned the sleeve 26 will be rotated for moving the compression or follower disk 29 downwardly within the body 10 for compressing the hard oil contained therein.

To one end of the arm 37 is pivoted a swinging locking leg or dog 39 which is adapted to depend therefrom at right angles thereto for engagement with a stop lug 40 formed exteriorly on the body 10 and in this manner the arm will be held against turning movement in one direction until the leg or dog 39 is raised out of engagement with the said stop lug. Contiguous to the pivotal connection of the leg or dog 39 with the arm 37 is a hand knob 41, and likewise mounted upon the free end of the arm 37 is a hand knob 42, which permit the convenient turning of the arm when operating the lubricating device. Connected with the arm 37 and the leg or dog 39 is a coiled retractile spring 43 which is designed to act upon the leg or dog to hold it in the path of the stop lug 40 when the leg or dog is in lowered position.

Pivotally connected to the outer end of the stem or shank 20 is an L-shaped latch arm 44 provided with a forked terminal 45 adapted to straddle the operating arm 37 when in the position shown in full lines in Fig. 1, so that the stem or shank will be rotated for the turning of the disk 23 simultaneously with the movement of the follower or compression disk 29, and in this manner bringing the port 24 successively into register with the channels 25 to deliver oil from the body 10 into the pipe 16 when it is desired to lubricate the bearings of the machinery, the arm 44 being readily raised out of engagement with the operating arm 37 against the resistance of a coiled expansion spring 46 which surrounds the stem or shank 20 between the head 34 of the sleeve 26 and a washer 47 working against the pivoted end of the arm 44, the said spring 46 being designed to hold the latch arm 44 either in raised or lowered position, that is to say, either engaged with the arm 37 or disengaged therefrom.

In the operation of the lubricating device the hard oil is placed within the body 10, and should it be desired to lubricate a single bearing the lever 37 is pressed down, which will compress the spring 38 and in this manner the clutch faces 35 and 36 will be disengaged from each other so that the follower disk 29 will remain stationary on the turning of the lever 37, but the disk 23 will be rotated, bringing its port 24 in direct alinement with the nipple 15 leading to the particular bearing to be oiled so that the oil will flow from the body 10 to the said bearing. The top 11 of the body 10 at its periphery is provided at intervals with indicating marks 48 which are adapted to co-act with the leg or dog 39 so that an operator can accurately determine the extent to which the lever 37 should be changed for the lubricating of any particular bearing of the machinery. It is of course to be understood that the arm 37 is thrown out of engagement with the sleeve 26 before setting the lever for lubricating a single bearing.

Should it be desired to lubricate all of the respective bearings of the machinery the latch arm 44 is engaged with the arm 37 and the leg or dog 39 is disengaged from the lug 40, whereupon an operator grips the knobs 41 and 42, turning the arm 37 a complete revolution, which rotates the distributing disks 23 for the registering of the port 24 successively with the channels 25 communicating with the nipples 15, the follower disk 29 being automatically lowered in the body 10, causing the compressing of the hard oil and thereby forcing it through the nipples to the pipes 16 which distributes the oil to all of the respective bearings of the machinery in a uniform and even manner.

Carried by the bottom 13 is a leaf spring catch 49 which is adapted to engage in a notch 50 formed in the lower edge of the body 10 so as to lock the bottom against turning movement, yet on disengaging the catch 49 from the said notch 50 the bottom can be removed from the body 10 so that the oil cup can be filled with hard oil, as will be clearly apparent.

From the foregoing it is thought that the construction and manner of operation of the device will be clearly understood, and therefore a more extended explanation has been omitted.

What is claimed is:

1. A device of the class described comprising an oil receiving body having an integral top, a removable bottom in said body, nipples extending from the bottom of the body and adapted to be connected with distributing tubes, the said bottom of the body being formed with varying sized channels communicating with the nipples, a turning spindle passed centrally through the body and having a circular-shaped major portion and a triangular-shaped minor portion in cross section, a rotatable disk engaged with the triangular-shaped portion of the said spindle and having a perforation for registration with any of the nipples, a sleeve surrounding the circular-shaped portion of the spindle and projected exteriorly of the top of the body and having a clutch end, a follower disk adjustably connected with the sleeve interiorly of the body, and means for operating the spindle and sleeve simultaneously or for operating the same independently of each other.

2. A device of the class described comprising an oil receiving body having an integral top, a removable bottom in said body, nipples extending from the bottom of the body and adapted to be connected with the distributing tubes, the said bottom of the body being formed with varying sized channels communicating with the nipples, a turning spindle passed centrally through the body and having a circular-shaped major portion and a triangular-shaped minor portion in cross section, a rotatable disk engaged with the triangular-shaped portion of the said spindle and having a perforation for registration with any of the nipples, a sleeve surrounding the circular-shaped portion of the spindle and projected exteriorly of the top of the body and having a clutch end, a follower disk adjustably connected with the sleeve interiorly of the body, means for operating the spindle and sleeve simultaneously or for operating the same independently of each other, and means coöperative with the last-named means and with the body for limiting the movement of the said last-named means.

3. A lubricating device comprising a hollow body, a top integral therewith and having a central boss, a spindle passed through the boss and body, discharge nipples depending from the bottom of the body, a disk engageable with the spindle for rotation therewith and having a perforation adapted for registration with any of the nipples, a sleeve surrounding the spindle, a follower plate adjustably connected with the sleeve, a clutch flange formed on the outer end of the sleeve, a lever having an opening receiving the sleeve, a clutch surface formed on the lever and engageable with the clutch flange, a latch pivotally connected with the spindle and engageable with the lever, a coiled expansion means surrounding the boss and working against the lever to hold the clutch surface and flange normally engaged with each other.

4. A lubricating device comprising a hollow body, a top integral therewith and having a central boss, a spindle passed through the boss and body, discharge nipples depending from the bottom of the body, a disk engageable with the spindle for rotation therewith and having a perforation adapted for registration with any of the nipples, a sleeve surrounding the spindle, a follower plate adjustably connected with the sleeve, a clutch flange formed on the outer end of the sleeve, a lever having an opening receiving the sleeve, a clutch surface formed on the lever and engageable with the clutch flange, a latch pivotally connected with the spindle and engageable with the lever, a coiled expansion means surrounding the boss and working against the lever to hold the clutch surface and flange normally engaged with each other, and handles mounted at opposite ends of the lever.

5. A lubricating device comprising a hollow body, a top integral therewith and having a central boss, a spindle passed through the boss and body, discharge nipples depending from the bottom of the body, a disk engageable with the spindle for rotation therewith and having a perforation adapted for registration with any of the nipples, a sleeve surrounding the spindle, a follower plate adjustably connected with the sleeve, a clutch flange formed on the outer end of the sleeve, a lever having an opening receiving the sleeve, a clutch surface formed on the lever and engageable with the clutch flange, a latch pivotally connected with the spindle and engageable with the lever, a coiled expansion means surrounding the boss and working against the lever to hold the clutch surface and flange normally engaged with each other, handles mounted at opposite ends of the lever, a stop lug formed on the body, and a dog pivoted to one end of the lever and engageable with the stop lug.

6. A lubricating device comprising a hollow body, a top integral therewith and having a central boss, a spindle passed through the boss and body, discharge nipples depending from the bottom of the body, a disk engageable with the spindle for rotation therewith and having a perforation adapted for registration with any of the nipples, a sleeve surrounding the spindle, a follower plate adjustably connected with the sleeve, a clutch flange formed on the outer end of the sleeve, a lever having an opening receiving the sleeve, a clutch surface formed on the lever and engageable with the clutch flange, a latch pivotally connected with the spindle and engageable with the lever, a coiled expansion means surrounding the boss and working against the lever to hold the clutch surface and flange normally engaged with each other, handles mounted at opposite ends of the lever, a stop lug formed on the body, a dog pivoted to one end of the lever and engageable with the stop lug, and means acting upon the dog and connected with the lever for holding the said dog normally in the path of the stop lug.

7. A lubricating device comprising a hollow body, a top integral therewith and having a central boss, a spindle passed through the boss and body, discharge nipples depending from the bottom of the body, a disk engageable with the spindle for rotation therewith and having a perforation adapted for registration with any of the nipples, a sleeve surrounding the spindle, a follower plate adjustably connected with the sleeve, a clutch flange formed on the outer end of the sleeve, a lever having an opening receiving the sleeve, a clutch surface formed on the lever and engageable with the clutch flange, a latch pivotally connected with the spindle and engageable with the lever, a coiled expansion means surrounding the boss and working against the lever to hold the clutch surface and flange normally engaged with each other, handles mounted at opposite ends of the lever, a stop lug formed on the body, a dog pivoted to one end of the lever and engageable with the stop lug, means acting upon the dog and connected with the lever for holding the said dog normally in the path of the stop lug, and means acting upon the latch member for holding it engaged with or out of engagement from the lever.

8. A lubricating device comprising a hollow body, a top integral therewith and having a central boss, a spindle passed through the boss and body, discharge nipples depending from the bottom of the body, a disk engageable with the spindle for rotation therewith and having a perforation adapted for registration with any of the nipples, a sleeve surrounding the spindle, a follower plate adjustably connected with the sleeve, a clutch flange formed on the outer end of the sleeve, a lever having an opening receiving the sleeve, a clutch surface formed on the lever and engageable with the clutch flange, a latch pivotally connected with the spindle and engageable with the lever, a coiled expansion means surrounding the boss and working against the lever to hold the clutch surface and flange normally engaged with each other, handles mounted at opposite ends of the lever, a stop lug formed on the body, a dog pivoted to one end of the lever and engageable with the stop lug, means acting upon the dog and connected with the lever for holding the said dog normally in the path of the stop lug, means acting upon the latch member for holding it engaged with or out of engagement from the lever, the said bottom being detachably engaged with the body, and means for locking the bottom to the body.

In testimony whereof I affix my signature in presence of two witnesses.

GERT J. VON HAGEL.

Witnesses:
E. H. YOUNGSTROM,
H. G. CLARK.